(12) United States Patent
Singh et al.

(10) Patent No.: US 8,768,305 B1
(45) Date of Patent: Jul. 1, 2014

(54) REESTABLISHING A MOBILE DEVICE RADIO RESOURCE CONTROL CONNECTION

(71) Applicant: Sprint Communications Company L.P., Overland Park, KS (US)

(72) Inventors: Jasinder Pal Singh, Olathe, KS (US); Maulik K. Shah, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 5 days.

(21) Appl. No.: 13/647,463

(22) Filed: Oct. 9, 2012

(51) Int. Cl.
*H04M 3/16* (2006.01)
(52) U.S. Cl.
USPC ........... 455/411; 455/410; 455/450; 455/510; 370/329
(58) Field of Classification Search
USPC .................... 455/411, 436–453, 509–512; 370/328–334
See application file for complete search history.

(56) References Cited

U.S. PATENT DOCUMENTS

| | | | |
|---|---|---|---|
| 2012/0077509 A1* | 3/2012 | Huang ........................ | 455/450 |
| 2012/0329442 A1* | 12/2012 | Luft et al. .................... | 455/418 |
| 2013/0039339 A1* | 2/2013 | Rayavarapu et al. ......... | 370/331 |
| 2013/0083650 A1* | 4/2013 | Taleb et al. .................. | 370/218 |
| 2013/0136078 A1* | 5/2013 | Bucknell et al. .............. | 370/329 |
| 2013/0150024 A1* | 6/2013 | Burbidge et al. ............. | 455/423 |
| 2013/0188604 A1* | 7/2013 | Chin et al. .................... | 370/331 |

\* cited by examiner

*Primary Examiner* — Lester Kincaid
*Assistant Examiner* — Mehmood B Khan

(57) ABSTRACT

Methods and systems for reestablishing a mobile device RRC connection based on eNodeB messaging. An RRC (Radio Resource Control) connection reestablishment request for the mobile device is received at a first eNodeB (Evolved NodeB). It is determined that the RRC connection reestablishment request requires mobile device context data that is unavailable at the first eNodeB. The first eNodeB communicates an initial mobile device service request message to an MME (Mobility Management Entity) based on a determination that the RRC connection request requires the mobile device context data that is unavailable at the first eNodeB. Upon communicating the initial mobile device service request message, the first eNodeB receives the mobile device context data in order to reestablish the mobile device RRC connection.

20 Claims, 7 Drawing Sheets

REESTABLISHING A MOBILE DEVICE RADIO RESOURCE CONTROL CONNECTION

SUMMARY

A high-level overview of the invention is provided here to disclose and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods and systems for reestablishing a mobile device RRC (Radio Resource Control) connection based on eNodeB (Evolved NodeB) messaging. Specifically, the mobile device generates an RRC connection reestablishment request. A first eNodeB receives the RRC connection reestablishment request and checks for the mobile device context data. It is determined that the RRC connection reestablishment request requires the mobile device context data that is unavailable at the first eNodeB. The first eNodeB communicates an initial mobile device service request message to an MME (Mobile Management Entity) based on determining that the RRC connection reestablishment request requires context data that is unavailable at the first eNodeB. The MME locates the mobile device context data on a second eNodeB. The MME then communicates a request to the second eNodeB to release the mobile device context data to the MME. The MME communicates the mobile device context data to the first eNodeB in order to reestablish the mobile device RRC connection.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
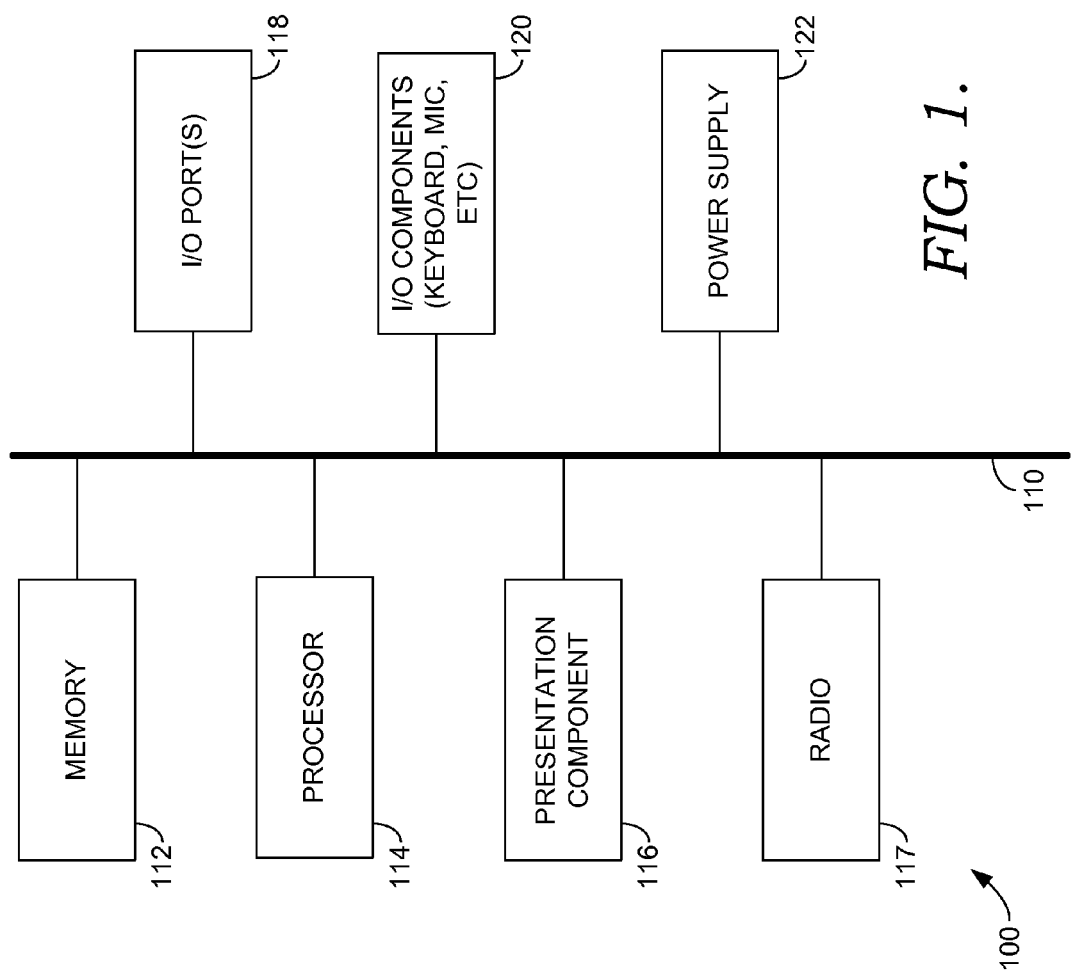
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| 3GPP | Third-Generation Partnership Project |
| AP | Application Protocol |
| AS | Access Stratum |
| CN | Core Network |
| CDMA | Code Division Multiple Access |
| EPC | Evolved Packet Core |
| EPS | Evolved Packet System |
| DL | Download |
| eNodeB | Evolved NodeB |
| E-UTRAN | Evolved UTRAN |
| GGSN | GPRS Gateway Support Node |
| GPRS | General Packet Radio Service |
| GSM | Global System for Mobile communications (Groupe Spécial Mobile) |
| HSS | Home Subscriber Server |
| HTTP | Hypertext Transfer Protocol |
| IP | Internet Protocol |
| LTE | Long Term Evolution |
| MME | Mobile Management Entity |
| NAS | Non Access Stratum |
| PDA | Personal Data Assistant |
| PDN | Packet Data Network |
| PDSN | Packet Data Serving Node |
| P-GW | Packet Gateway |
| QoS | Quality of Service |
| RLF | Radio Link Failure |
| RNC | Radio Network Controller |
| RRC | Radio Resource Control |
| SAE | System Architecture Evolution |
| S-GW | Serving Gateway |
| S-TMSI | SAE Temporary Mobile Subscriber Identity |
| UL | Upload |
| UE | User Equipment |
| UMTS | Universal Mobile Telecommunications System |
| UTRAN | UMTS Terrestrial Radio Access Network |
| VoIP | Voice over IP |

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or set of instructions embodied on one or more computer-readable media. Computer-readable media may be transitory or non-transitory media. Non-transitory computer-readable media exclude transitory propagating signals per se. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disc storage, and other magnetic storage devices. These technologies can store data momentarily, temporarily, or permanently.

By way of background, a mobile device may experience an RLF in areas of weak coverage in which downlink and uplink coverage fails. The downlink radio link quality of the serving cell (e.g., eNodeB) may be monitored by the mobile device for the purpose of indicating out-of-sync/in-sync status to higher layers in the protocol stack. An RLF may occur due to degradation of the air interface during an ongoing voice or data service where generally the physical layer detects an RLF when the mobile device becomes unsynchronized. When an RLF occurs, the mobile device may release dedicated signaling links between the mobile device and the network, which leads to a dropped call or interruption of a data application. The mobile device uses a first and second timer T310 and T311 respectively to restore the connection with the eNodeB during the period of the radio link problem detection and an RLF.

In operation, in a first phase, the mobile device is in a normal operation mode and in an RRC_Connected state. After a radio link problem is detected, the first timer T310 is started to recover from the radio link problem. However, if the mobile device does not recover during the T310 period, the T310 timer expires, and the radio link problem becomes an RLF. This starts a second phase where the mobile device is still in the RRC_Connected state, a second timer T311 is started, and the mobile device generates an RRC reestablishment request to the eNodeB. The RRC reestablishment request of the mobile device to an eNodeB signals an RLF at the mobile device. If the RRC reestablishment request goes to an eNodeB that does not have context data for the mobile device, the eNodeB rejects the request and replies with an RRC connection reestablishment rejection message. Thus, as a result of the T311 timer eventually expiring, the mobile device call is dropped and the mobile device switches to an RRC_IDLE state. Accordingly, the mobile device has to go through a completely new RRC connection request procedure, comprising initial security activation and/or authentication to establish mobile device context data and eventually a new call.

Embodiments of the present invention provide an efficient and simple method for circumventing the RRC connection reestablishment request rejection in order to improve mobile device functionality during an RLF. As discussed above, currently if the eNodeB does not have the mobile device context data, the eNodeB rejects the RRC reestablishment request, triggering an RRC_IDLE state on the mobile device and a new complete RRC connection request. Circumventing the RRC reestablishment request rejection using the algorithm and messaging tree suggested herein will improve the user experience. For example, the mobile device will not have to drop a call simply because the new eNodeB did not have context data for the mobile device. Further, the overall efficiency of the network will also be improved as a result of reduced signaling, such as the mobile device performing a new RRC connection request, as a result of the dropped call.

Accordingly, in a first aspect of the present invention, computer-readable media having computer-executable instructions embodied thereon that, when executed, enable a computing device to perform a method for reestablishing a mobile device RRC connection based on eNodeB messaging. The method includes receiving at a first eNodeB an RRC connection reestablishment request for a mobile device. The method further includes determining that the RRC connection reestablishment request requires the mobile device context data that is unavailable at the first eNodeB. The method also includes communicating via the first eNodeB an initial mobile device service request message to an MME based on the determination that the RRC connection reestablishment request requires context data that is unavailable at the first eNodeB. Further, in response to communicating the initial mobile device service request message, receiving the mobile device context data in order to reestablish the mobile device RRC connection.

In a second aspect of the present invention, computer-readable media having computer-executable instructions embodied thereon that, when executed, enable a computing device to perform a method for reestablishing a mobile device RRC connection based on eNodeB messaging. The method includes receiving an initial mobile device service request message via a first eNodeB based on the first eNodeB receiving an RRC connection reestablishment request from a mobile device, the mobile device context data being unavailable at the first eNodeB. The method also includes, upon receiving the initial mobile device service request message, identifying the mobile device context data on a second eNodeB. The method includes requesting release of the mobile device context data from the second eNodeB. The method further includes communicating to the first eNodeB the mobile device context data in order to reestablish the mobile device RRC connection.

In a third aspect of the present invention, a system is provided for reestablishing a mobile device RRC connection based on eNodeB messaging. The system includes a first eNodeB configured for receiving the RRC connection reestablishment request for the mobile device. The first eNodeB is also configured to determine that the RRC connection reestablishment request requires the mobile device context data that is unavailable at the first eNodeB. The first eNodeB communicates an initial mobile device service request message to an MME based on the determination that the RRC connection request requires context data that is unavailable at the first eNodeB. The first eNodeB further, in response to communicating the initial mobile device service request message, receives the mobile device context data in order to reestablish the RRC connection of the mobile device. The system further includes an MME configured for receiving an initial mobile device service request message via the first eNodeB based on the first eNode receiving the RRC connection reestablishment request from the mobile device, wherein the mobile device context data is unavailable at the first eNodeB. The MME further, upon receiving the initial mobile device service request message, identifies the mobile device context data on a second eNodeB. The MME is also configured to request release of the mobile device context data from the second eNodeB and to communicate to the first eNodeB the mobile device context data in order to reestablish the RRC connection of the mobile device.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, LTE and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2A:
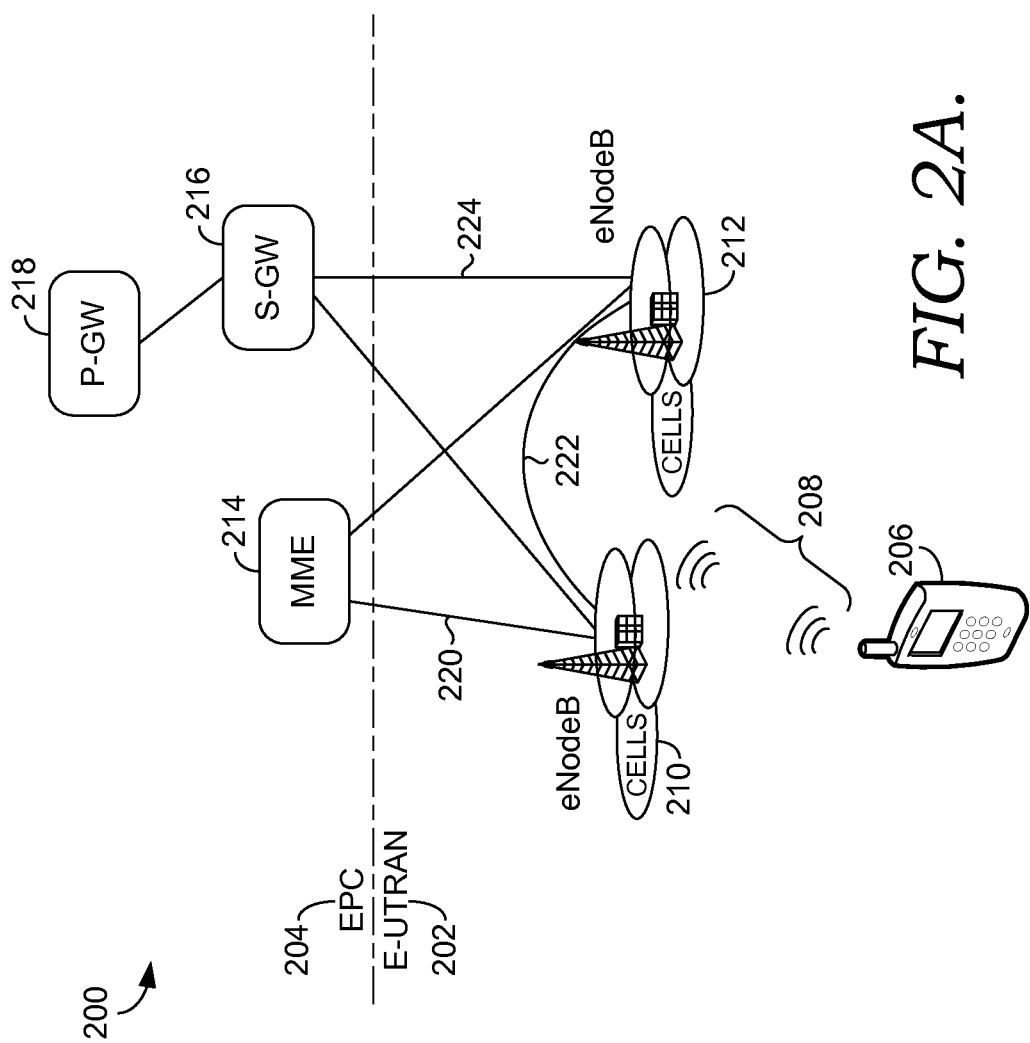
FIG. 2A depicts an illustrative network environment for carrying out embodiments of the present invention.
Figure 2B:
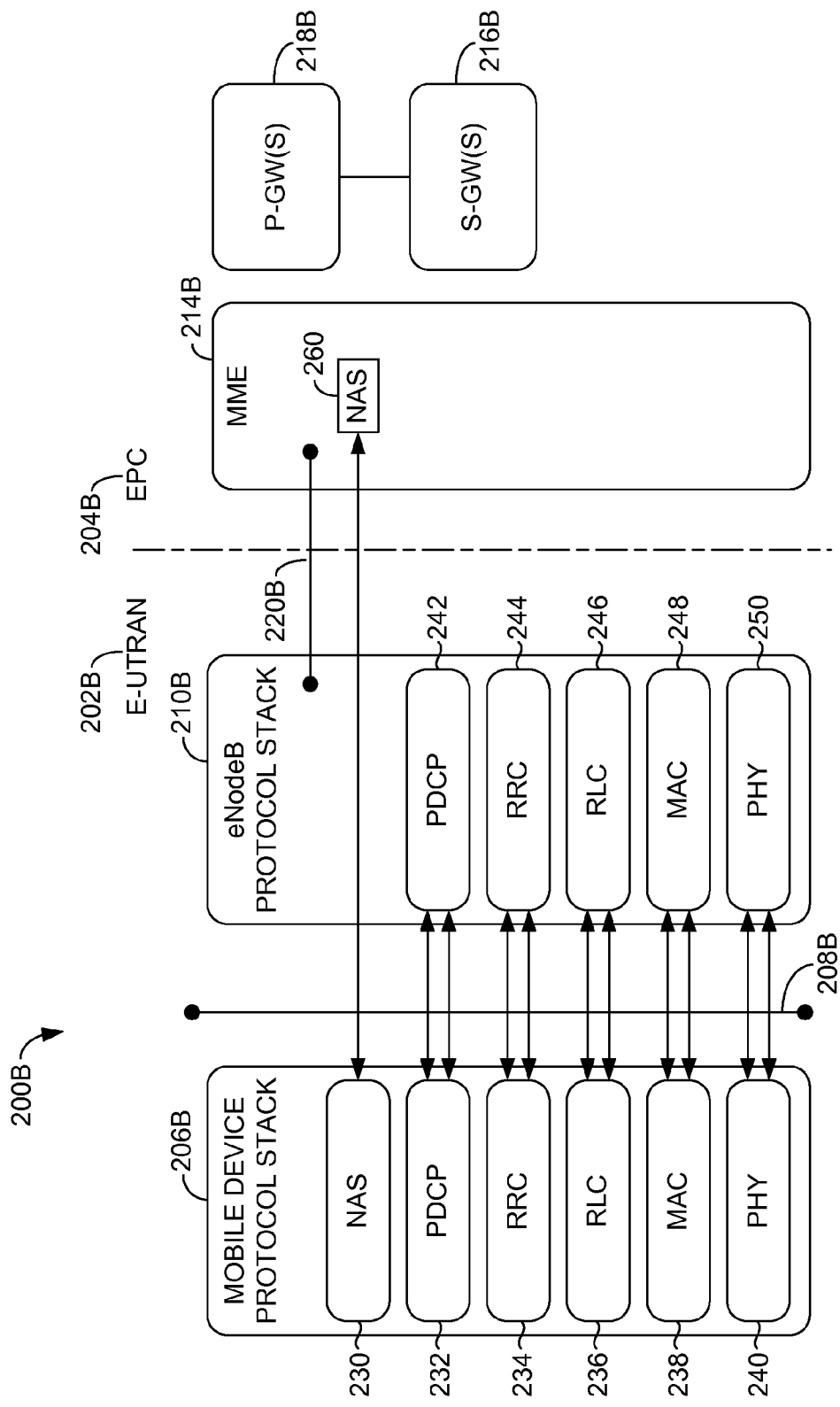
FIG. 2B depicts an illustrative network environment for carrying out embodiments of the present invention.

Turning now to FIGS. 2A and 2B, exemplary network environments suitable for use in implementing embodiments of the present invention are illustrated and designated generally as network environment 200 and 200B respectively. Network environments 200 and 200B are only examples of suitable network environments and are not intended to suggest any limitation as to the scope of use or functionality of the invention. Neither should the network environment be interpreted as having any dependency of requirement relating to any one or combination of components illustrated.

The network environments 200 and 200B may be LTE Long Term Evolution (LTE) networks that support packet-switched services. LTE provides seamless Internet Protocol (IP) connectivity between mobile devices (e.g., mobile device 206) and the packet data network, without any disruption to the end users' applications during mobility. "LTE" encompasses the evolution of the UMTS radio access through the E-UTRAN 202. It is accompanied by an evolution of the nonradio aspects under the term SAE which includes the EPC 204. Together LTE and SAE comprise the EPS. EPS uses the concept of EPS bearers to route IP traffic from a gateway in the packet data network to the mobile device. A bearer is an IP packet flow with a defined QoS between the gateway and the mobile device. The E-UTRAN 202 and EPC 204 together set up and release bearers as required by applications. EPS provides the user with IP connectivity for accessing Internet, as well as for running services such as VoIP. Overall, the network architecture includes several network elements and standardized interfaces. The E-UTRAN 202 is the access network that includes nodes such as eNodeB 210 and eNodeB 212 and an air interface 208, and the EPC 204 is the core network that includes logical nodes: MME 214, S-GW 216, and P-GW 218. In FIG. 2B, the network environment 200B includes components designated as E-UTRAN 202B, EPC 204B, mobile device 206B, air interface 208B, eNodeB 210B, MME 214B, S-GW 216B and P-GW 218B. The network components in FIG. 2B are discussed interchangeably with corresponding counterparts in FIG. 2A for simplicity purposes, unless otherwise specifically stated to the contrary.

With continued reference to FIGS. 2A and 2B mobile device 206, in one embodiment, is the type of device described in connection with FIG. 1 herein. Mobile device 206 may make and receive telephone calls over a radio link while moving around wide geographic areas. In addition to telephony, mobile device 206 may support a wide variety of other services (e.g., text messaging, MMS, e-mail, Internet access, short range wireless communication, applications, and gaming). Calls from mobile device 206 may be received at eNodeB 210 or eNodeB 212 and routed in through the EPC 204. Mobile device 206 may communicate with eNodeB 210 or eNodeB 212 and the EPC 204 by way of an air interface 208. The air interface 208 is a radio-based communication link between the mobile device 206 and the eNodeBs and the MME 214. As best shown in FIG. 2B, mobile device 206B hosts the PHYsical (PHY 240), Medium Access Control (MAC 238), Radio Link Control (RLC 236), Radio Resource Control (RRC 234) and Packet Data Control Protocol (PDCP 232) and Non-access Stratum (NAS 230) layers for communication via air interface 208B.

Each eNodeB (e.g., eNodeB 210 and eNodeB 212) is connected by a link using an interface (e.g., interfaces 220, 222 and 224). For example, an S1 interface (e.g., 220B) may allow for communication between eNodeB 210B to higher-level entities including MME 214B and the S-GW 216B. The S1 interface may be used for managing the system and sending control signaling to other nodes, particularly eNodeBs, in the network. Each eNodeB also hosts the PHYsical (PHY 250), Medium Access Control (MAC 248), Radio Link Control (RLC 246), Radio Resource Control (RRC 244) and Packet Data Control Protocol (PDCP 242) layers that include the additional functionality. In particular, the RRC protocol layer exists in the mobile device 206B and eNodeB 210B. The RRC protocol layer broadcasts system information related to the nonaccess stratum. It further establishes, maintains, and releases an RRC connection between the mobile device and the E-URAN. It also provides NAS direct message transfer to or from NAS from or to the mobile device 206B. The eNodeB 210B also performs many functions including radio resource management, admission control, scheduling, enforcement of negotiated UL/DL QoS, cell information broadcast, ciphering/deciphering of user and control plane data, and compression/decompression of user plane packet headers.

The MME 214 is the control node that processes the signaling between the mobile device 206 and the EPC 204. The protocols running between the mobile device 206 and the EPC 204 may be a NAS protocol on the mobile device 206 and MME 214 respectively. NAS (e.g., 230 and 260) is the highest stratum of the user plane and control plane between the mobile device 206B and the MME 214B at the radio interface. Main functions of the protocols that are part of the NAS are the support of mobility of the mobile device and the support of session management procedures to establish and maintain IP connectivity between the mobile device and a packet data network. NAS signaling is responsible for generation and allocation of temporary identities to mobile devices and for checking the authorization of the mobile device to use the network. The MME 214B serves as the termination point for the NAS signaling.

Further, additional functions supported by the MME 214 can be classified as: functions related to bearer management. This includes the establishment, maintenance and release of the bearers and is handled by the session management layer in the NAS 260 protocol. The MME 214 also controls functions related to connection management. This includes the establishment of the connection and security between the EPC 204 and is handled by the connection or mobility management layer in the NAS 260 protocol layer. The MME 214 creates context data when the mobile device 206 is turned on and attaches to the network. It assigns a unique short temporary identity termed the S-TMSI to the mobile device that identifies the mobile device context in the MME 214. This mobile device 206 context holds user subscription information downloaded from an HSS (not shown). The local storage of subscription data in the MME 214 allows faster execution of procedures such as bearer establishment since it removes the need to consult the HSS every time. In addition, the mobile device 206 context also holds dynamic information such as the terminal capabilities and the list of bearers that are established. The MME 214 is also responsible for the reestablishment of the radio bearers and for updating the mobile device context data in the eNodeB. Security functions are also the responsibility of the MME 214 for both signaling and user data. Security functions may include initial security activation, such as activating security and/or authentication of the mobile device upon RRC establishment.

When a mobile device attaches with the network, a mutual authentication of the mobile device and the network is performed between the mobile device 206 and the MME 214. The authentication process is a process similar to 'log in' process on a computer. The authentication process may be bidirectional authentication, meaning that mobile device has to pass the authentication process and the network also has to pass the process as well. This authentication function also establishes the security keys that are used for encryption of the bearers. By way of example, bidirectional authentication commands may include: RRC:DL Information Transfer+ NAS:Authentication Request, RRC:UL Information Transfer+NAS:Authentication Response, RRC:DL Information Transfer+NAS:Security Mode Command and RRC:UL Information Transfer+NAS:Security Mode Complete.

Figure 3:
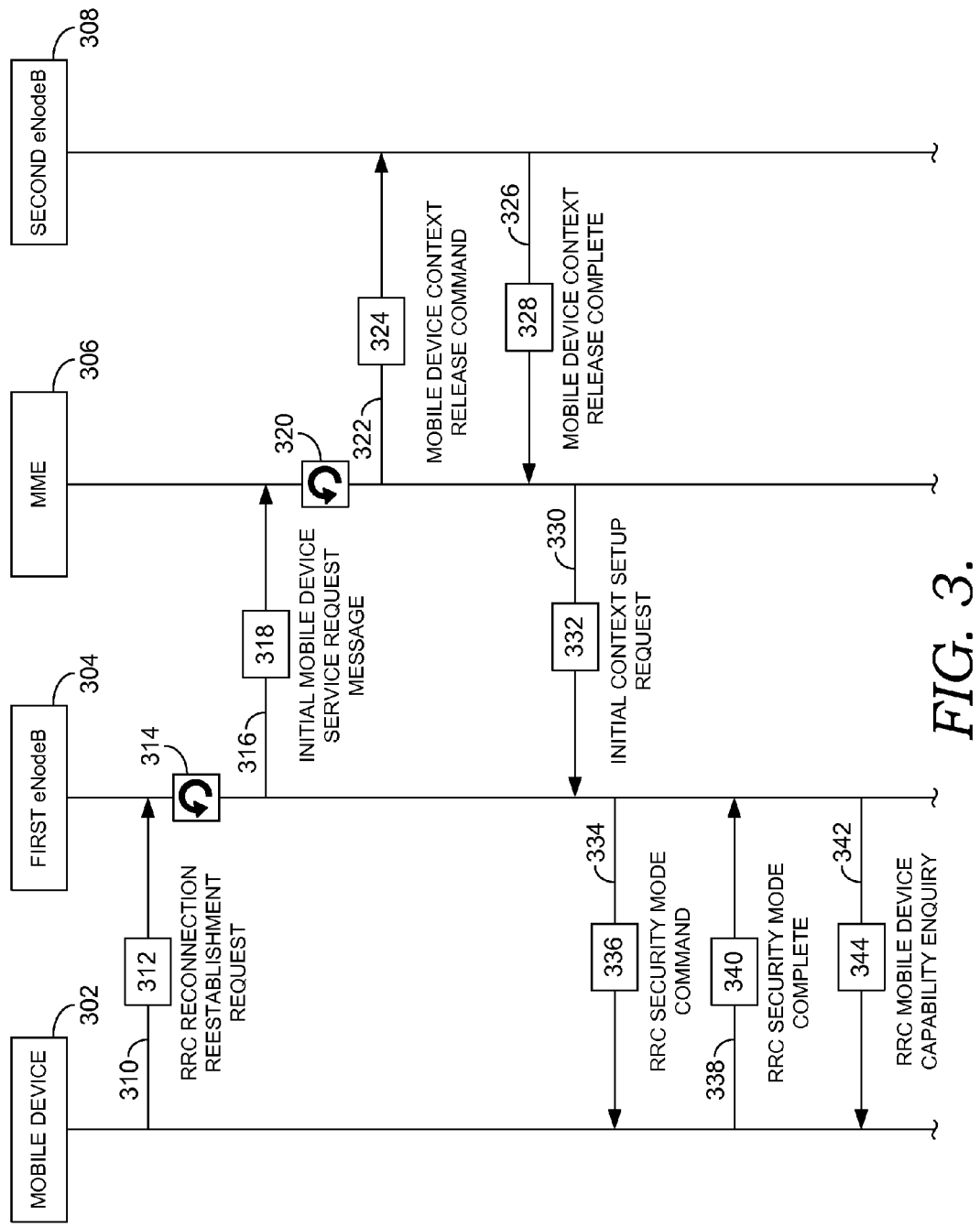
FIG. 3 depicts a flow diagram illustrating a method for reestablishing a mobile device RRC connection based on eNodeB messaging, in accordance with an embodiment of the present invention.
Figure 3:
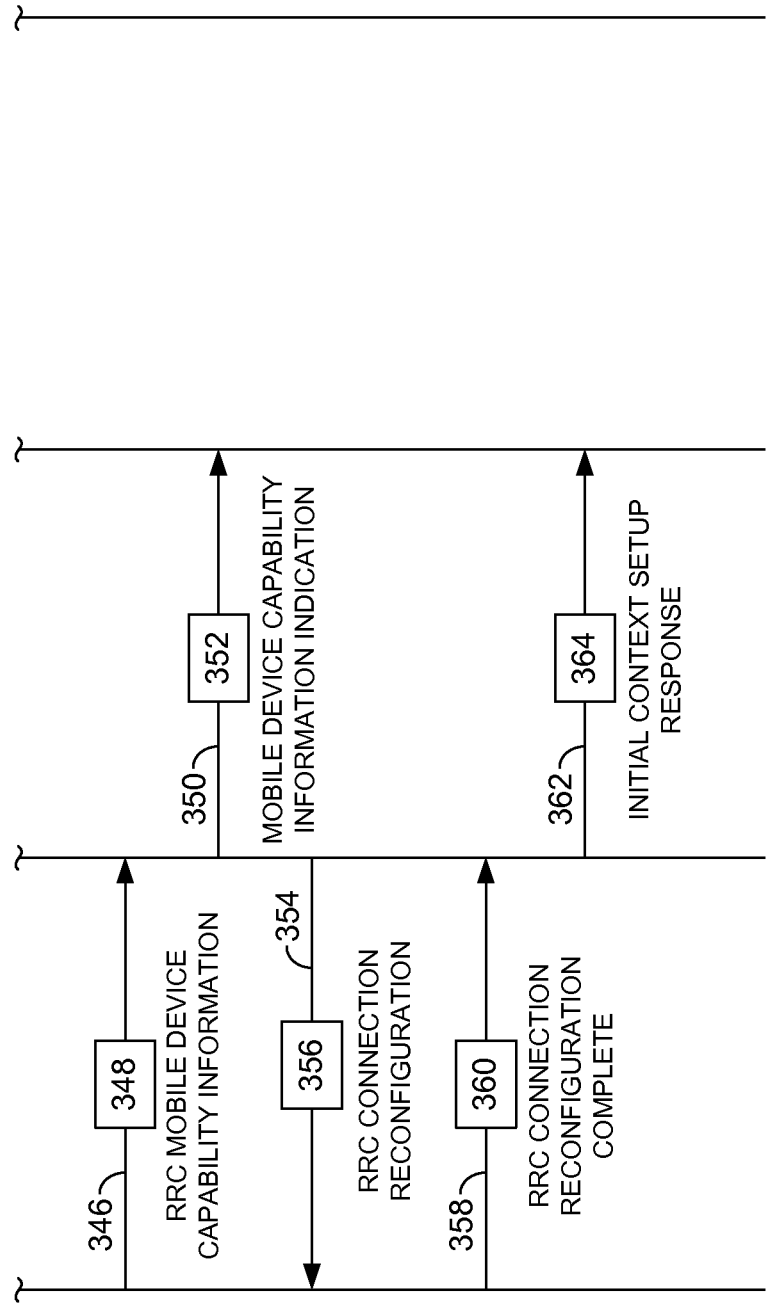

Turning now to FIG. 3, a flow diagram illustrating a method for reestablishing a mobile device RRC connection based on eNodeB messaging. The components illustrated in FIG. 3 include a mobile device 302, a first eNodeB 304, an MME 306, and a second eNodeB 308. The mobile device 302 generates 310 an RRC connection reestablishment request 312. The purpose of the RRC connection reestablishment request 312 is to reestablish the RRC connection, which involves the resumption of operation and the reactivation of security. In one embodiment, the mobile device 302 generates the RRC connection reestablishment request as a result of an RLF on the mobile device 302. It is contemplated that the mobile device may skip initial security activation knowing that the mobile device has already been authenticated via another eNodeB. The reestablishment occurs when the eNodeB has valid mobile device context data. The RRC connection reestablishment request may also use an RRC protocol. The RRC control protocol may be used to configure and control the radio resource between the mobile device 302 and the eNodeBs.

At step 314, it is determined that the RRC connection reestablishment request 312 requires mobile device 302 context data that is unavailable at the first eNodeB 304. As mentioned above, reestablishment occurs when the eNodeB has valid mobile device context data. Instead of rejecting the reestablishment request, the first eNodeB communicates 316 an initial mobile device service request message 318 to the MME 306 based on the determination that the RRC connection request requires mobile device context data that is unavailable at the first eNodeB 304. In this regard, the mobile device 302 does not receive a reestablishment request rejection. As such, it is contemplated that the mobile device does not change from the RRC_Connected state to the RRC_IDLE state, but rather maintains the RRC_Connected state until the RRC connection is reestablished via eNodeB messaging.

Upon receiving the initial mobile device service request message 318, the MME 306, at step 320, identifies the mobile device 302 context data on another eNodeB (e.g., second eNodeB 308). The MME 306 is configured to create mobile device 302 context data when the mobile device 302 is turned on and attaches to the network. In embodiments, the MME 306 assigns a unique short temporary identity S-TMSI to the mobile device that identifies the mobile device in the MME. It is contemplated that the MME may use the S-TMSI of the mobile device to locate another eNodeB with the mobile device context data.

With continued reference to FIG. 3, the MME 306 requests 322 release of the mobile device context data with a mobile device context release command 324. The mobile device release command 324 is communicated to the second eNodeB 308. The purpose of the mobile device context data release procedure is to enable the MME 306 to order the release of the mobile device-associated logical connections. Upon reception of the mobile device release command 324, the second eNodeB 308 releases the mobile device context data. The mobile device context data may include all related signaling and user data transport resources. The second eNodeB communicates 326 a reply, a mobile device context release complete 328 message, to the MME 306. It is contemplated that MME 306 skips initial security activation such as the authentication and NAS security commands of connection establishment procedures. The MME 306 may exclude the commands based on knowing that the mobile device 302 has already been authenticated using the commands with the second eNodeB 308 from which the mobile device context data is retrieved. As such, the MME 306 communicates 330 an initial context setup request to the first eNodeB 304 in order to reestablish the mobile device RRC connection. It is further contemplated that mobile device 302 remains in the RRC_Connected state throughout the eNode messaging to reestablish the mobile device RRC connection, as such, the call is not dropped during the above described steps.

Additional steps to complete the RRC connection reestablishment procedure may include communicating 334 an RRC security mode command 336 to the mobile device 302 from the first eNodeB 304. The mobile device 302 replies 338 with an RRC security mode complete 340 to the first eNodeB 304. The first eNodeB then generates 342 an RRC mobile device capability enquiry 344 to the mobile device 302. The mobile device 302 responds 346 with RRC mobile device capability information 348. The first eNodeB 304 sends 350 the mobile device capability indication to the MME 306. The first eNodeB 304 communicates 354 an RRC connection configuration 356 to the mobile device 302. The mobile device 302 replies 358 with an RRC connection reconfiguration complete 360 message to the first eNodeB 304. The first eNodeB then sends 362 an initial context setup response 364 to the MME 306.

Figure 4:
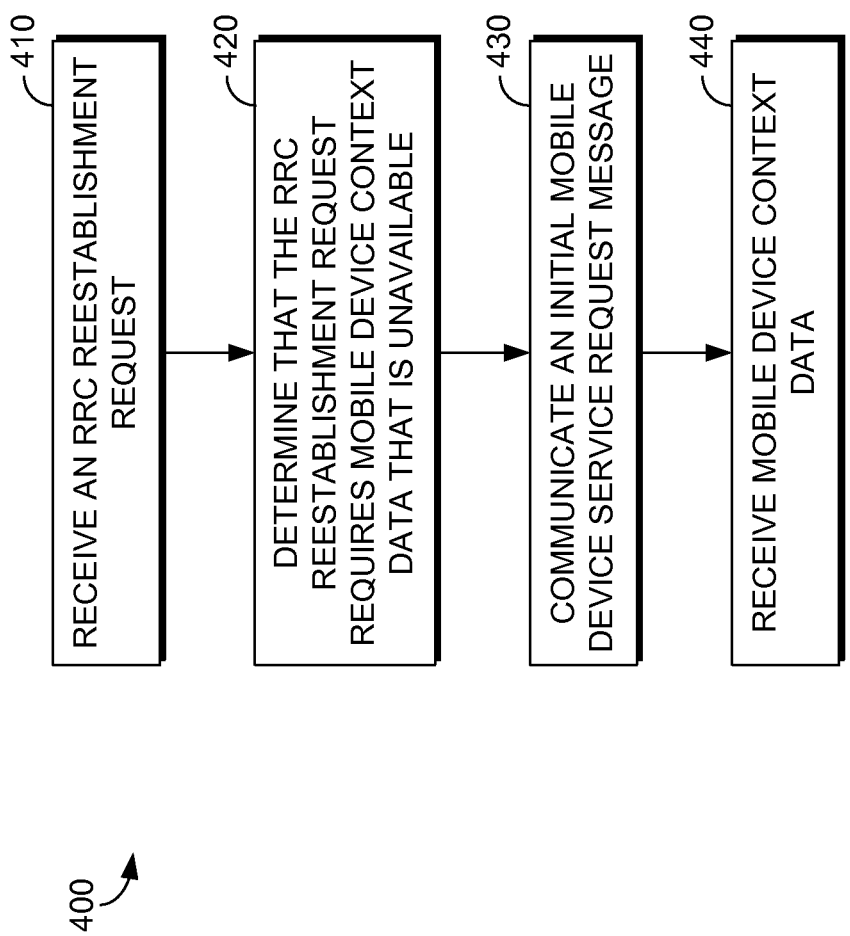
FIG. 4 depicts a flowchart illustrating a method for reestablishing a mobile device RRC connection based on eNodeB messaging, in accordance with an embodiment of the present invention.

Referring to FIG. 4, a flowchart illustrates a method for reestablishing a mobile device RRC connection based on eNodeB messaging, in accordance with an embodiment of the present invention. Initially, at step 410, an RRC reestablishment request for a mobile device is received at a first eNodeB. It is contemplated that the mobile device maintains an RRC_Connected state upon generating the RRC connection reestablishment request in order to reestablish the RRC connection without returning to an RRC_Idle state on the mobile device. At step 420, it is determined that the RRC reestablishment request requires the mobile device context data that is unavailable at the first eNodeB. Instead of rejecting the RRC reestablishment request, at step 430, the first eNodeB communicates an initial mobile device service request message based on the determination that the RRC connection request requires mobile device context data that is unavailable at the first eNodeB. At step 440, in response to communicating the initial mobile device service request, receives the mobile device in order to establish the RRC connection with the mobile device. It is contemplated that the mobile device data may be received from a second eNodeB via the MME.

Figure 5:
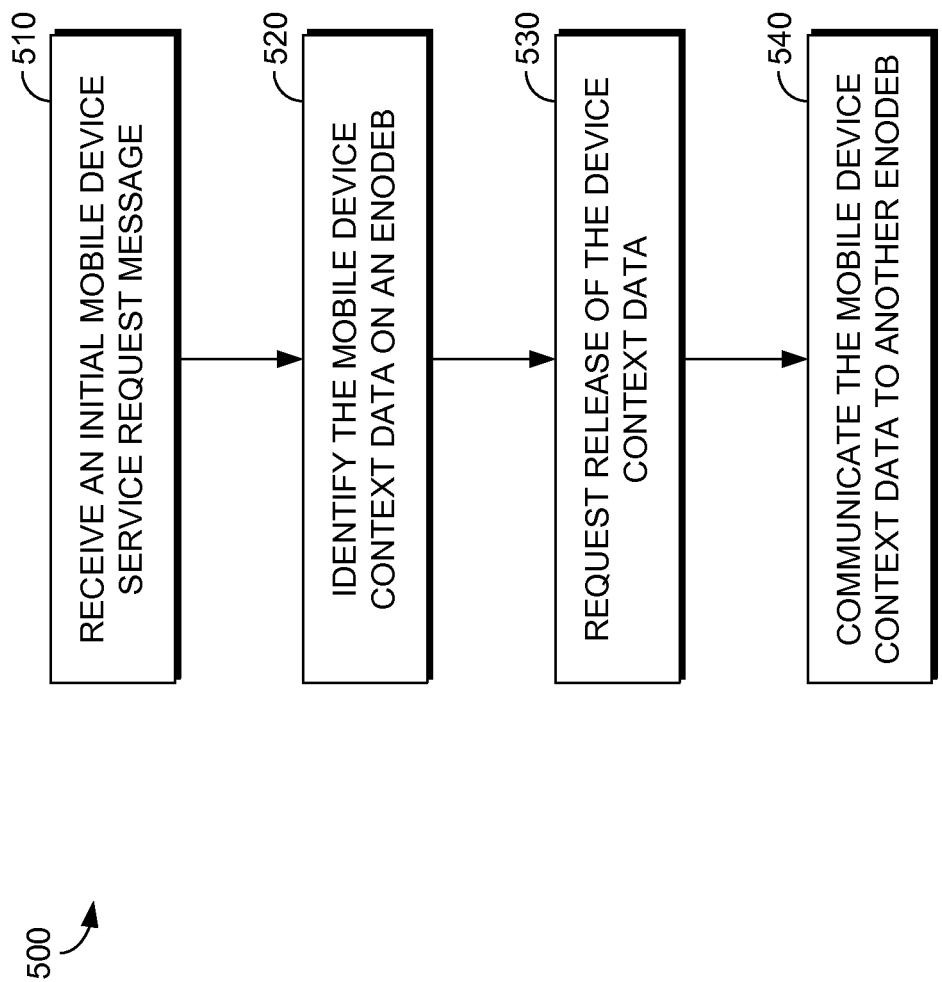
FIG. 5 depicts a flowchart illustrating a method for reestablishing a mobile device RRC connection based on eNodeB messaging, in accordance with an embodiment of the present invention.

Referring to FIG. 5, a flowchart illustrates a method for reestablishing a mobile device RRC connection based on eNodeB messaging, in accordance with an embodiment of the present invention. Initially, at step 510, an initial mobile device service request message is received via a first eNodeB. The initial mobile device service request message may be a NAS message from the mobile device via the eNodeB to the MME. The message is received based on the first eNodeB receiving an RRC connection reestablishment request from a mobile device. The RRC connection request requires the mobile device context data that is unavailable at the first eNodeB. At step 520, the mobile device context data is identified on a second eNodeB. The MME assigns a unique short temporary identity termed the S-TMSI to the mobile device that identifies the mobile device context data in the MME. As such, it is contemplated that the S-TMSI may be used in identifying the second eNodeB that has the mobile device context data. At step 530, release of the mobile device context data is requested from the second eNodeB. The mobile device context data may include all related signaling and user data transport resources. It is also contemplated that the MME may receive a release completed message from the second eNodeB. At step 540, the mobile device context data is communicated to the first eNodeB in order to reestablish the RRC connection of the mobile device. It is further contemplated that the mobile device does not change from the RRC_Connected state to the RRC_IDLE state, but rather maintains the RRC_Connected state until the RRC connection is reestablished via eNodeB messaging as described above.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method for reestablishing a mobile device RRC connection based on eNodeB messaging, the method comprising:
   receiving at a first eNodeB an RRC connection reestablishment request for a mobile device, wherein the mobile device maintains an RRC_Connected state upon sending the RRC connection reestablishment request until the mobile device RRC connection is reestablished via eNodeB messaging that excludes initial security activation of the mobile device;
   determining that the RRC connection reestablishment request requires mobile device context data that is unavailable at the first eNodeB;
   communicating via the first eNodeB an initial mobile device service request message to an MME based on determining that the RRC connection reestablishment request requires context data that is unavailable at the first eNodeB; and
   upon communicating the initial mobile device service request message, receiving the mobile device context data in order to reestablish the mobile device RRC connection.

2. The media of claim 1, wherein the RRC connection reestablishment request for the mobile device is generated as a result of a radio link failure at the mobile device.

3. The media of claim 1, wherein the mobile device maintains an RRC_Connected state upon generating the RRC connection reestablishment request at the start of a T311 timer until the mobile device RRC connection is reestablished via eNodeB messaging prior to the expiration of the T311 such that the mobile device does not return to an RRC_Idle state.

4. The media of claim 1, wherein upon determining that the RRC connection reestablishment request requires the mobile device context data that is unavailable at the first eNodeB, the first eNodeB does not communicate an RRC connection reestablishment rejection message.

5. The media of claim 1, wherein the initial mobile device service request message is a NAS message communicated from the mobile device via the eNodeB to the MME.

6. The media of claim 1, wherein the MME identifies the mobile device context is available on a second eNodeB that releases the mobile device context based on a request from the MME.

7. The media of claim 1, wherein the initial security activation comprises bidirectional authentication between the mobile device and the MME.

8. The media of claim 7, wherein the bidirectional authentication of the mobile device comprises one or more selected from the following:
   an RRC:DL Information Transfer+NAS:Authentication Request;
   the RRC:UL Information Transfer+NAS:Authentication Response;
   the RRC:DL Information Transfer+NAS:Security Mode Command; and
   the RRC:UL Information Transfer+NAS:Security Mode Complete.

9. The media of claim 1, wherein the mobile device context data is received from a second eNodeB via the MME.

10. The media of claim 1, further comprising:
    receiving at the first eNodeB a mobile device context data setup request;
    forwarding the mobile device context data setup request to the mobile device;
    receiving mobile device capabilities from the mobile device; and
    reconfiguring the mobile device RRC connection via a reconfiguration connection message.

11. Non-transitory computer-readable media having computer-executable instructions embodied thereon that, when executed, enable a computing device to perform a method for reestablishing a mobile device RRC connection based on eNodeB messaging the method comprising:
    receiving an initial mobile device service request message via a first eNodeB based on the first eNodeB receiving an RRC connection reestablishment request from a mobile device, wherein mobile device context data is unavailable at the first eNodeB;
    upon receiving the initial mobile device service request message, identifying the mobile device context data on a second eNodeB;
    requesting release of the mobile device context data from the second eNodeB, wherein the mobile device maintains an RRC_Connected state upon sending the RRC connection reestablishment request until the mobile device RRC connection is reestablished via eNodeB messaging that excludes initial security activation of the mobile device; and communicating to the first eNodeB the mobile device context data in order to reestablish the mobile device RRC connection.

12. The media of claim 11, wherein identifying the mobile device context data on the second eNodeB utilizes an S-TMSI of the mobile device.

13. The media of claim 11, wherein release of the mobile device context data from the second eNodeB further comprises release of one or more mobile device-associated logical connections with the second eNodeB.

14. The media of claim 11, wherein reestablishing the mobile device RRC connection further comprises:
communicating an initial context setup request;
receiving mobile device capability information indication; and
upon completion of an RRC connection reconfiguration of the mobile device, receiving an initial context setup response.

15. The media of claim 11, wherein reestablishing the mobile device RRC connection excludes an initial security activation of the mobile device.

16. The media of claim 15, wherein excluding the initial security activation is based on a determination of prior authentication of the mobile device with the second eNodeB.

17. The media of claim 16, wherein the determination of prior authentication is based at least in part on release of the mobile device context data from the second eNodeB.

18. A system for reestablishing a mobile device RRC connection based on eNodeB messaging, the system comprising:
a first eNodeB configured for:
    (1) receiving an RRC connection reestablishment request for the mobile device;
    (2) determining that the RRC connection reestablishment request requires mobile device context data that is unavailable at the first eNodeB;
    (3) communicating via the first eNodeB an initial mobile device service request message based on determining that the RRC connection reestablishment request requires context data that is unavailable at the first eNodeB; and
    (4) upon communicating the initial mobile device service request message, receiving the mobile device context data in order to reestablish the mobile device RRC connection
an MME configured for:
    (1) receiving the initial mobile device service request message via the first eNodeB based on the first eNodeB receiving the RRC connection reestablishment request from a mobile device, wherein the mobile device context data is unavailable at the first eNodeB;
    (2) upon receiving the initial mobile device service request message, identifying the mobile device context data on a second eNodeB;
    (3) requesting release of the mobile device context data from the second eNodeB, wherein the mobile device maintains an RRC_Connected state upon sending the RRC connection reestablishment request until the mobile device RRC connection is reestablished via eNodeB messaging that excludes initial security activation of the mobile device; and
    (4) communicating to the first eNodeB the mobile device context data in order to reestablish the mobile device RRC connection.

19. The system of claim 18, further comprising:
the mobile device configured for:
    (1) generating the RRC connection reestablishment request; and
    (2) reestablishing the mobile device RRC connection of the mobile device based on the mobile device context data from the first eNodeB, wherein the first eNodeB received the mobile device context data from the second eNodeB via the MME.

20. The system of claim 18, further comprising:
the second eNodeB configured for:
    (1) receiving a request to release the mobile device context data based on the MME identifying the mobile device context data on the second eNodeB; and
    (2) releasing the mobile device context data to the MME in order to reestablish the mobile device RRC connection.

* * * * *